United States Patent [19]
Veligdan

[11] Patent Number: 6,002,826
[45] Date of Patent: Dec. 14, 1999

[54] THIN DISPLAY OPTICAL PROJECTOR

[75] Inventor: James T. Veligdan, Manorville, N.Y.

[73] Assignee: Brookhaven Science Associates, Upton, N.Y.

[21] Appl. No.: 09/141,975

[22] Filed: Aug. 28, 1998

[51] Int. Cl.$^6$ ..................................................... G02B 6/04
[52] U.S. Cl. .......................... 385/120; 385/115; 385/119; 385/116; 362/554; 362/556; 349/62; 349/95
[58] Field of Search ..................................... 385/115, 116, 385/119, 120, 121, 901; 349/62, 95; 362/554, 556, 560

[56] References Cited

U.S. PATENT DOCUMENTS

| | | | |
|---|---|---|---|
| 5,381,502 | 1/1995 | Veligdan | 385/115 |
| 5,455,882 | 10/1995 | Veligdan | 385/116 |
| 5,481,385 | 1/1996 | Zimmerman et al. | 349/62 |
| 5,521,725 | 5/1996 | Beeson et al. | 349/95 |
| 5,583,683 | 12/1996 | Scobey | 359/127 |
| 5,600,745 | 2/1997 | Wuu et al. | 385/49 |
| 5,625,736 | 4/1997 | Veligdan | 385/120 |

OTHER PUBLICATIONS

Beiser et al, "Ten Inch Planar Optic Display," Proceedings of the International Society for Optical Engineering (SPIE), vol. 2734, Apr. 1996, 9 pages.

Yoder, "The State–of–the–Art in Projection Display: An Introduction to the Digital Light Processing DLP, " Texas Instruments Web Site, Mar. 1997, 5 pages.

DeSanto et al, "Polyplanar Optical Display Electronics, " Proceedings of the International Society (SPIE), vol. 3057, Apr. 1997, 12 pages.

*Primary Examiner*—Phan T. H. Palmer
*Attorney, Agent, or Firm*—Margaret C. Bogosian

[57] ABSTRACT

An optical system (20) projects light into a planar optical display (10). The display includes laminated optical waveguides (12) defining an inlet face (14) at one end and an outlet screen (16) at an opposite end. A first mirror (26) collimates light from a light source (18) along a first axis, and distributes the light along a second axis. A second mirror (28) collimates the light from the first mirror along the second axis to illuminate the inlet face and produce an image on the screen.

14 Claims, 3 Drawing Sheets

THIN DISPLAY OPTICAL PROJECTOR

This invention was made with Government support under contract number DE-AC02-98CH10886, awarded by the U.S. Department of Energy. The Government has certain rights in the invention.

BACKGROUND OF THE INVENTION

The present invention relates generally to planar optical displays, and, more specifically, to a light projection system therefor.

A thin optical display panel having a plurality of laminated optical waveguides is disclosed in U.S. Pat. No. 5,381,502 over which the present invention is an improvement. Each of the waveguides in the panel includes a transparent core laminated between opposite cladding layers having a lower index of refraction. The waveguides collectively define an inlet face at one end and an outlet face or screen at an opposite end disposed obliquely to the inlet face. The screen forms an extremely small acute face angle with the longitudinal axes of the waveguides, on the order of about 1 or 2 degrees, which allows the height of the screen to be substantially larger than the depth or thickness of the panel for keeping the panel thin.

The thin panel may be used for various applications such as a television video display screen with an exemplary width to height ratio of 4:3 with 525 vertical lines of resolution. This resolution may be simply effected by correspondingly using 525 stacked waveguides which are continuous along the width of the panel. The panel inlet face, therefore, extends the full width of the panel but is extremely narrow corresponding with the thinness of the panel. For example, the thickness of the panel at the inlet face may be about 2.54 cm, with the height of the screen being 100 cm, and a corresponding width of 133 cm. The corresponding thickness of each of the waveguides is about 48 microns.

In the original development of the thin panel, a laser beam was employed to directly produce collimated light which is sequentially scanned laterally and transversely along the inlet face for producing a corresponding image on the screen in the horizontal and vertical directions, respectively. Various types of lenses may be used with the laser beam for ensuring a high resolution image on the screen, but lenses require precise alignment and inherently effect chromatic aberrations which adversely affect the produced image.

Accordingly, it is desired to provide an improved light projector for use with the thin waveguide panel for reducing complexity and cost, and eliminating chromatic aberration.

SUMMARY OF THE INVENTION

An optical system projects light into a planar optical display. The display includes laminated optical waveguides defining an inlet face at one end and an outlet screen at an opposite end. A first mirror collimates light from a light source along a first axis, and distributes the light along a second axis. A second mirror collimates the light from the first mirror along the second axis to illuminate the inlet face and produce an image on the screen.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
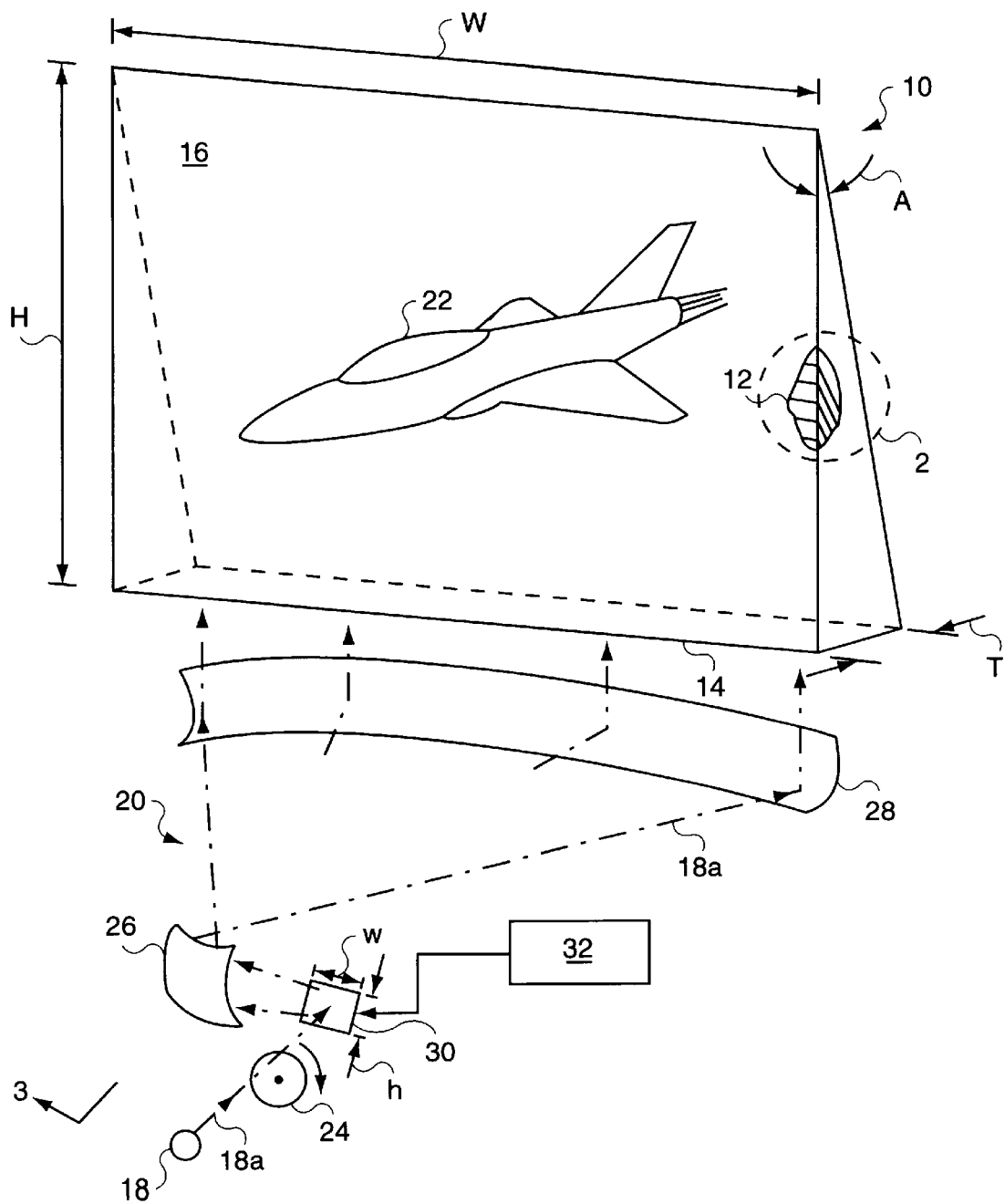
FIG. 1 is a perspective view of an optical display panel receiving light from an optical projector shown schematically in accordance with an exemplary embodiment of the present invention.
Figure 2:
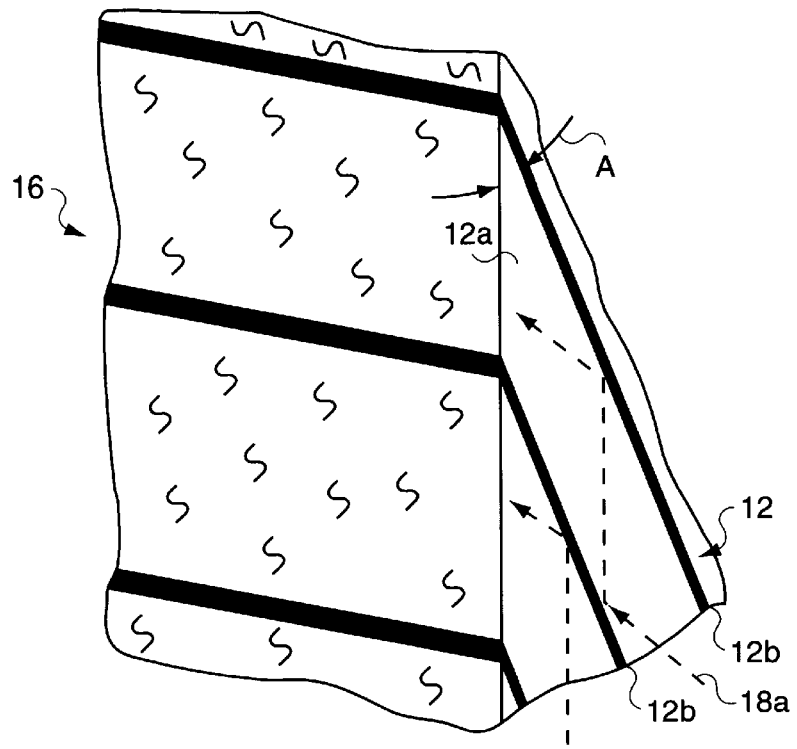
FIG. 2 is an enlarged portion of part of the display panel illustrated in FIG. 1 within the dashed circle labeled 2 illustrating exemplary optical waveguides therein.

Illustrated in FIG. 1 is an optical display panel 10 including a plurality of stacked or laminated optical waveguides 12 collectively defining an inlet face 14 at a vertically lower end of the panel, and an outlet face or screen 16 at an opposite end thereof disposed obliquely thereto. As shown in more detail in FIG. 2, each of the waveguides 12 is in the exemplary form of a ribbon or sheet including a transparent central core 12a bonded between opposite cladding layers 12b. The cladding 12b has an index of refraction which is less than that of the core 12a for effecting total internal reflection of light 18a transmitted to the cores from the inlet face 14 to the screen 16. The inlet face 14 may be optically polished for receiving the light, and the screen 16 may be frosted for diffusing the light thereat.

As shown in FIG. 1, the waveguides 12 are laterally continuous for the entire width W of the panel. The waveguides 12 are laminated or stacked in the transverse direction in a sufficient number for providing suitable vertical resolution of the screen 16. For example, there may be 525 waveguides 12 transversely stacked together to effect a maximum depth or thickness T of the panel.

The screen 16 is planar or flat, and oblique or substantially perpendicularly to the inlet face 14. This is effected by beveling the outlet faces of the waveguides at a small acute angle A on the order of 1 or 2 degrees, for example, relative to the longitudinal axes of the individual waveguides 12. In this way, the inlet face 14 may be extremely narrow or thin, for example about 2.54 cm, with the screen 16 being relatively tall in height H over the full width W of the screen. The height H may be about 100 cm, for example, with the width W being about 133 cm in a typical 4:3 width to height aspect ratio for the screen 16, although other ratios, such as 16:9, may also be effected.

The display panel 10 is of the type initially patented in U.S. Pat. No. 5,381,502 and enjoys all the benefits disclosed therein attributable to the laminated, thin panel design, including flat or curved panel forms. However, in that patent a collimated laser beam was disclosed in a system for scanning the beam both laterally along the inlet face of the panel for horizontally discriminating the light, and transversely along the depth or thickness of the panel for vertically discriminating the light.

In accordance with the present invention, an improved optical projection system or projector 20 is illustrated schematically in FIG. 1 for projecting the light 18a into the inlet face 14 for transmission through the respective waveguides 12 to produce a viewable image 22 on the screen 16.

The projector 20 includes a suitable white light source 18 which may be a relatively simple non-collimated light bulb, such as a bright halogen light bulb, for producing white light for example. Other types of light sources may be used, and may even include lasers if desired.

Color may be introduced in the projected light 18a in any suitable manner. For example, a conventional color wheel 24 having red, green, and blue portions may be mounted adjacent the light source 18 and rotated for selectively coloring the light to produce a color image 22 on the screen.

Since the light 18a is not collimated, a first reflecting mirror 26 is optically aligned with the light source 18, with the color wheel 24 being suitable optically aligned therebetween. The first mirror 26 is provided for collecting and collimating the diffuse light from the source 18 along a first axis which is vertical in FIG. 1, and then distributing by expansion the light along a second axis which is horizontal in FIG. 1, and orthogonal with the first axis.

A second reflecting mirror 28 is optically aligned with the first mirror 26 for horizontally collimating the light reflected from the first mirror along the second axis, and stops horizontal expansion to illuminate the inlet face 14 and produce the video image 22 on the screen 16.

The use of the first and second mirrors 26, 28 with the diffuse light source 18 reduces or eliminates the need for lenses in the projection system, reduces complexity and cost, and eliminates chromatic aberration inherent in lenses. However, in order to produce a suitable video image 22 on the screen 16, the diffuse light must be collimated and transmitted through the waveguides to the screen 16. The first and second mirrors 26, 28, therefore, are preferably parabolic in section for collimating the light 18a for distribution over the entire area of the inlet face 14.

The first mirror 26 is suitably optically aligned with the light source 18 for firstly reflecting the light 18a therefrom for laterally or horizontally distributing the light along the second axis. The second mirror 28 is optically aligned with the first mirror 26 for secondly reflecting the laterally distributed light for transversely or vertically distributing the light along the first axis orthogonal to the second axis to illuminate the entire inlet face 14 and produce the image 22 on the screen 16.

The first and second mirrors 26, 28 are therefore effective for both collimating the light 18a as the light is firstly and secondly reflected therefrom in turn, as well as suitably distributing the light over the entire inlet face 14. The light then travels along the different length waveguides 12 to illuminate the screen 16 and produce the image 22 thereon.

Since the light 18a is diffuse without distinction, it must be suitably modulated in intensity for discriminating the picture elements or pixels both horizontally and vertically in the screen 16. This may be accomplished by using a light modulator 30 shown in FIGS. 1 and 3 optically disposed and aligned between the light source 18 and the first mirror 26. The light modulator 30 is effective for selectively modulating the light 18a from the source 18 prior to its first reflection in the first mirror 26.

The modulator 30 may take any conventional form such as a digital micromirror device (DMD) which is commercially available from Texas Instruments, Inc., USA. The DMD 30 is in the exemplary form of a 640 by 480 element array of binary light deflectors or micromirrors which are individually selectively tiltable over a plus and minus 10° range. The DMD is operatively joined to a suitable electrical controller or processor 32 configured to selectively reflect the light 18a either toward the first mirror 26 or away therefrom and provide horizontal and vertical discrimination for producing the displayed image 22.

As indicated above, the color wheel 24 may be disposed between the light source 18 and the modulator 30 for selectively coloring the light from the source prior to the first reflection in the first mirror 26 to produce a color image 22 on the screen 16.

Referring again to FIGS. 1 and 3, the first and second mirrors 26, 28 are optically aligned in sequence with the display inlet face 14 to provide collimated and non-focused light both laterally along the horizontal extent of the face 14 and transversely along the depth of the face 14 to correspondingly produce the image 22 both horizontally and vertically on the screen 16.

The video image 22 is initially generated at the modulator 30 which is typically a small device of about a square centimeter in area. The DMD, for example, has a width w and height h, with a corresponding width to height first aspect ratio w/h. The first aspect ratio may be square or rectangular, such as the 4:3 television aspect ratio.

The display inlet face 14 by the very nature of the thin display 10 is narrow in depth or thickness T over the entire full width W with a corresponding width to depth second aspect ratio W/T which is substantially different and larger than the first aspect ratio w/h. For example, the second aspect ratio is about 52 based on the exemplary sizes of the display 10 introduced above.

The display screen 16 as introduced above has a corresponding third aspect ratio W/H which is necessarily different from the second aspect ratio W/T of the inlet face 14, and for example is 4:3, which matches the first aspect ratio of the modulator 30.

The light which is carried along the optical train from the modulator 30 to the screen 16 must be suitably expanded laterally and transversely in order to form a properly scaled image 22 on the screen 16. Given the dimensions of the panel 10 and the light modulator 30, the required contours of the first and second mirrors 26, 28 may be conventionally determined by analysis or experimentation. The parabolic first and second mirrors 26, 28 are suitably contoured to distribute the light from the modulator 30 both laterally and transversely across the display inlet face 14 to produce the image 22 across the screen 16 in conformance with the preselected first, second, and third aspect ratios. Since the image 22 is born from the modulator 30 which is substantially smaller in area than the screen 16, the image is initially compressed, and therefore, must be decompressed or expanded along the optical train using the first and second mirrors 26, 28 to reconfigure the image to the aspect ratio of the screen 16 with uniform scale therein.

Figure 3:
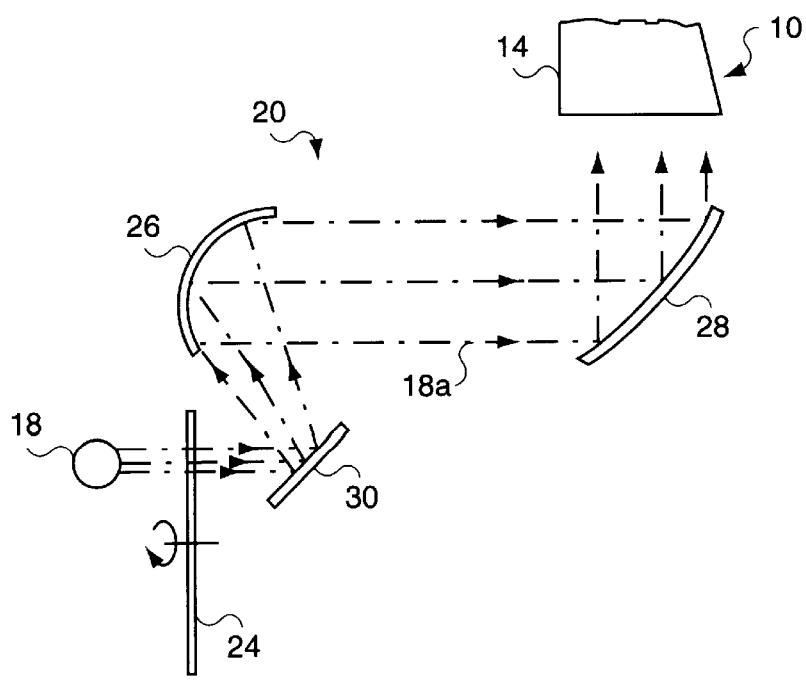
FIG. 3 is a transverse sectional view through the optical system illustrated in FIG. 1 and taken generally along line 3—3.

As shown in FIGS. 1 and 3, the first mirror 26 is contoured in a suitable parabola along the horizontal axis to laterally expand or decompress the light from the modulator 30 to match the lateral width of the inlet face 14. The first mirror 26 is also parabolic vertically along the first axis to vertically collimate the light.

Correspondingly, the second mirror 28 is preferably contoured in a parabola horizontally or laterally to horizontally collimate the light from the first mirror 26 and stop horizontal expansion thereof to match the inlet face 14 along its full horizontal width W. The second mirror 28 may be parabolic to vertically collimate the light in conjunction with the first mirror 26. Or, the second mirror may be vertically constant or straight if the first mirror provides complete collimation.

Since the first mirror 26 illustrated in FIG. 3 is parabolic and receives light from the adjoining modulator 30, the modulator 30 is suitably positioned off-axis to the first mirror 26 to allow unobstructed reflection of the light from the first mirror 26 to the second mirror 28. In this way, the modulator 30 may be offset below the first mirror 26 providing an unobstructed light path from the light source 18.

Figure 4:
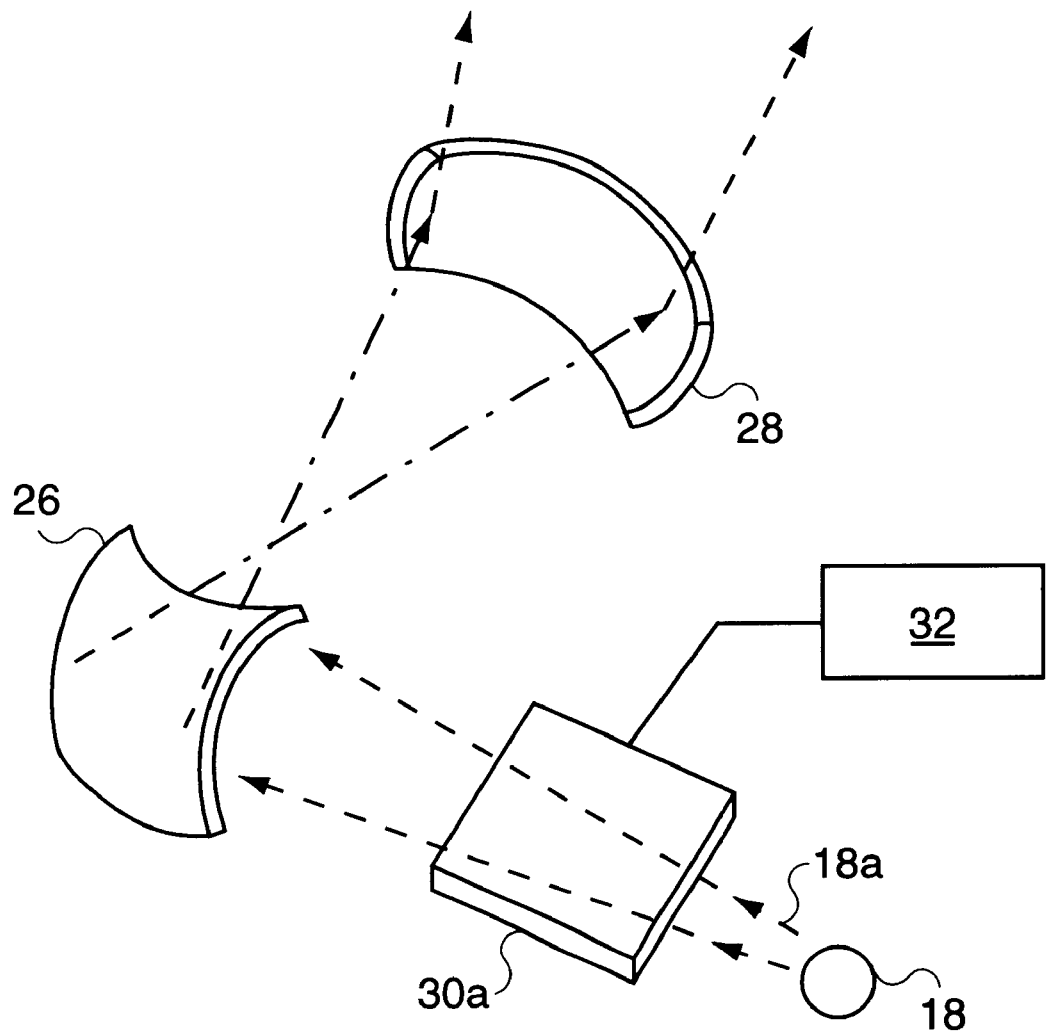
FIG. 4 is an alternate embodiment of the optical system illustrated in FIG. 3 including a light transmissive modulator therein.

In the first embodiment of the invention illustrated in FIGS. 1 and 3, the first modulator 30 is in the form of the DMD optically aligned between the light source 18 and the first mirror 26 for selectively reflecting the light therebetween in response to the controller 32. FIG. 4 illustrates an alternate embodiment of the present invention wherein the light modulator is in the form of a conventional liquid crystal display 30a optically aligned between the light source 18 and the first mirror 26 for selectively transmitting the light 18a therebetween. The LCD 30a may have a suitable number of pixel elements which may be individually turned on and off for transmitting or blocking portions of the light as desired to effect the screen image 22. The same first and second mirrors 26, 28 may be used with the LCD modulator 30a for the same performance and advantages as in the first embodiment described above.

The light projector 20 described above utilizes relatively simple parabolic mirrors 26, 28 with a diffuse light source 18 for collimating and expanding the light from the modulators 30, 30a to illuminate the display inlet face 14 and produce a suitable image 22 on the screen 26. This system eliminates the need for precision collimating or focusing lenses, and eliminates the attendant chromatic aberration therefrom. The system is inherently compact, and may include, if desired, additional folding mirrors to further improve the packaging of the projector with the display panel 10 in a minimum volume.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. An optical system 20 for projecting light into an optical display panel 10 including a plurality of laminated optical waveguides 12 defining an inlet face 14 at one end and an outlet screen 16 at an opposite end disposed obliquely thereto, comprising:

a light source 18;

a first mirror 26 for collimating light from said source 18 along a first axis, and distributing said light along a second axis; and a second mirror 28 optically aligned with said first mirror 26 for collimating said light reflected therefrom along said second axis, and distributing said light to illuminate said inlet face and produce an image 22 on said screen 16.

2. A system according to claim 1 wherein said first and second mirrors 26, 28 are parabolic.

3. A system according to claim 2 further comprising a light modulator 30, 30a optically disposed between said light source 18 and said first mirror 26.

4. A system according to claim 3 wherein:

said modulator 30 has a width to height first aspect ratio;

said display inlet face 14 has a width to depth second aspect ratio different than said first aspect ratio;

said display screen 16 has a width to height third aspect ratio different than said second aspect ratio; and said first and second mirrors 26, 28 are contoured to distribute said light from said modulator 30 across said display inlet face 14 to produce said image across said screen 16 in conformance of said first, second, and third aspect ratios.

5. A system according to claim 4 wherein:

said first mirror 26 is contoured to laterally expand said light from said modulator to match said inlet face 14; and said second mirror 28 is contoured to stop said lateral expansion of said light from said first mirror 26 to match said inlet face 14.

6. A system according to claim 5 wherein said modulator comprises a digital micromirror device 30 optically aligned between said light source 18 and said first mirror 26 for selectively reflecting light therebetween.

7. A system according to claim 5 wherein said light source 18 is non-collimated.

8. A system according to claim 5 wherein said modulator comprises a liquid crystal display 30a optically aligned between said light source 18 and said first mirror 26 for selectively transmitting light therebetween.

9. A system according to claim 6 further comprising a color wheel 24 optically aligned between said light source 18 and said first mirror 26 for selectively coloring said light to produce a color image 22 on said screen.

10. A system according to claim 3 wherein said first and second mirrors 26, 28 are optically aligned in sequence with said display inlet face 14 to provide collimated, non-focused light laterally and transversely thereacross.

11. A method for projecting light into an optical display panel 10 including a plurality of laminated optical waveguides 12 defining an inlet face 14 at one end and an outlet screen 16 at an opposite end disposed obliquely thereto, comprising:

firstly reflecting light from a source 18 for laterally distributing said light along an axis; and secondly reflecting said laterally distributed light for transversely distributing said light along another axis orthogonal with said one axis to illuminate said inlet face 14 and produce an image 22 on said screen 16.

12. A method according to claim 11 further comprising collimating said light as said light is firstly and secondly reflected.

13. A method according to claim 12 further comprising selectively modulating said light from said source 18 and prior to said first reflection thereof.

14. A method according to claim 13 further comprising selectively coloring said light from said source 18 and prior to said first reflection thereof.

* * * * *